(12) United States Patent
Hotard et al.

(10) Patent No.: US 10,989,606 B2
(45) Date of Patent: Apr. 27, 2021

(54) GAS IMPERMEABLE TEMPERATURE SENSOR PROTECTION SYSTEM

(71) Applicant: DAILY THERMETRICS CORPORATION, Houston, TX (US)

(72) Inventors: Carson Hotard, Houston, TX (US); Larry Welch, Richmond, TX (US); Ian Savaya, Houston, TX (US); Raymond Litteaur, Missouri City, TX (US)

(73) Assignee: DAILY THERMETRICS CORPORATION, Houston, TX (US)

( * ) Notice: Subject to any disclaimer, the term of this patent is extended or adjusted under 35 U.S.C. 154(b) by 73 days.

(21) Appl. No.: 16/488,323

(22) PCT Filed: Apr. 23, 2019

(86) PCT No.: PCT/US2019/028707
§ 371 (c)(1),
(2) Date: Aug. 23, 2019

(87) PCT Pub. No.: WO2019/209818
PCT Pub. Date: Oct. 31, 2019

(65) Prior Publication Data
US 2021/0041301 A1    Feb. 11, 2021

Related U.S. Application Data (60) Provisional application No. 62/801,457, filed on Feb. 5, 2019, provisional application No. 62/661,196, filed on Apr. 23, 2018.

(51) Int. Cl.
*G01K 1/00* (2006.01)
*G01K 7/00* (2006.01)
*G01K 1/08* (2021.01)
*G01K 7/02* (2021.01)

(52) U.S. Cl.
CPC .................... *G01K 1/08* (2013.01); *G01K 7/02* (2013.01)

(58) Field of Classification Search
USPC .............. 374/179, 208, 148, 166, 4, 1
See application file for complete search history.

(56) References Cited

U.S. PATENT DOCUMENTS

| 6,059,453 A | 5/2000 | Kempf et al. |
| 2007/0258506 A1 | 11/2007 | Schwagerman et al. |
| 2017/0328781 A1 | 11/2017 | Litteaur et al. |

FOREIGN PATENT DOCUMENTS

WO    2009/071455    6/2009

OTHER PUBLICATIONS

International Search Report and Written Opinion dated Jul. 24, 2019 for corresponding PCT Application No. PCT/US19/28707.

*Primary Examiner* — Mirellys Jagan
(74) *Attorney, Agent, or Firm* — Duane Morris LLP; Diana M. Sangalli (57) ABSTRACT

In one aspect, a temperature sensing assembly includes a thermowell, a temperature sensor, and at least one electrically conductive element. The thermowell includes a first gas impermeable barrier element defining a first chamber and a second gas impermeable barrier element defining a second chamber. The temperature sensor is at least partially disposed within the first chamber. The at least one electrically conductive element is connected to the temperature sensor in the second chamber.

22 Claims, 7 Drawing Sheets

GAS IMPERMEABLE TEMPERATURE SENSOR PROTECTION SYSTEM

CROSS-REFERENCE TO RELATED APPLICATIONS

This application is a national phase entry under 35 U.S.C. § 371 of international patent application no. PCT/US2019/28707, filed PCT/US2019/028707, filed Apr. 23, 2019, which claims priority to U.S. Provisional Patent Application No. 62/801,457, filed on Feb. 5, 2019, and U.S. Provisional Patent Application No. 62/661,196, filed on Apr. 23, 2018, the entireties of which are incorporated herein by reference.

FIELD

The present disclosure relates to process sensor systems, and more specifically to thermowell sensor housings for sensors in industrial process monitoring systems.

BACKGROUND

Thermocouples are used in a variety of applications to sense temperature at a given location. A typical thermocouple comprises an external sheath and a pair of rod-shaped conductors disposed longitudinally within the sheath. Each conductor is of a dissimilar metallic material, and the two conductors are joined at a distal end within the sheath. An electrical insulation material also is packed about the rods within the sheath. The free ends of the conductors are connected to a detection instrument, such as a voltmeter, that measures the difference in potential created at the junction of the two metals. This difference in potential changes with temperature, thereby readily permitting the accurate detection of temperature at the junction point.

Thermocouples are used to measure the temperature of process fluids in a variety of industries, including, for example, the chemical, petroleum, and manufacturing industries. These thermocouples may be protected by a thermowell. Such thermowells are designed to be in the process flow and protect the temperature sensor from damage caused by direct contact with the fluid.

SUMMARY

In one aspect, a temperature sensing assembly includes a thermowell, a temperature sensor, and at least one electrically conductive element. The thermowell includes a first gas impermeable barrier element defining a first chamber and a second gas impermeable barrier element defining a second chamber. The temperature sensor is at least partially disposed within the first chamber. The at least one electrically conductive element is connected to the temperature sensor in the second chamber.

In another aspect, a temperature sensing assembly includes a thermowell and a temperature sensor. The thermowell includes a protection tube and a sealing element. The protection tube extends from a first end to a second end and is configured to be at least partially disposed within a process stream or vessel. The first end of the protection tube is closed. The sealing element has a seal engaged with the second end of the protection tube such that a chamber is defined within the protection tube and gas within the process stream or vessel is prevented from entering the chamber. The temperature sensor is disposed at least partially within the chamber.

In another aspect, a method of measuring temperature in a process stream includes positioning a temperature sensing assembly at least partially within the process stream. The temperature sensing assembly includes a thermowell, a temperature sensor, and at least one electrically conductive element. The thermowell includes a first gas impermeable barrier element defining a first chamber and a second gas impermeable barrier element defining a second chamber. The temperature sensor is at least partially disposed within the first chamber. The at least one electrically conductive element is connected to the temperature sensor in the second chamber.

In another aspect, a method of detecting a leak in a thermowell includes exposing a temperature sensing assembly to a process stream. The temperature sensing assembly includes a thermowell, a first temperature sensor, and a second temperature sensor. The thermowell includes a protection tube and a sealing element. The protection tube extends from a first end to a second end and is configured to be at least partially disposed within the process stream. The first end of the protection tube is closed. The sealing element has a seal engaged with the second end of the protection tube such that a chamber is defined within the protection tube and gas within the process stream is prevented from entering the chamber. The first temperature sensor is disposed at least partially within the chamber. The second temperature sensor is configured to monitor the temperature of a portion of the sealing element to detect a leak in the thermowell. The method also includes obtaining measurements from the second temperature sensor. The method also includes comparing a first measurement from the second temperature sensor taken at a first time to a second measurement from the second temperature sensor taken at a second time.

BRIEF DESCRIPTION OF THE DRAWINGS

The features of the embodiments described herein will be more fully disclosed in the following detailed description, which is to be considered together with the accompanying drawings wherein like numbers refer to like parts and further wherein.

DETAILED DESCRIPTION

This description of the exemplary embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

As used herein, the term "gas impermeable" means impermeable to the passage of at least some gas molecules when operating within a designed temperature range. Gas impermeable may mean impermeable to all gas molecules or impermeable to one or more specific molecules or compounds.

As used herein, the term "gas impermeable barrier element" means an individual component or group of components that define a chamber that is gas impermeable such that the barrier element prevents the passage of gas molecules from outside of the chamber to the inside of the chamber, except through pre-determined channels (determined, for example, by the manufacturer, installer, or user), when operating within a designed temperature range. Gas impermeable barrier elements may be impermeable to all gas molecules or may be selectively configured to allow the permeation of certain molecules or compounds while preventing permeation of other molecules or compounds.

The temperature sensing assemblies described herein may be used in any application, but are particularly well suited to use in industrial processes. For example, the temperature sensing assemblies described herein may be used in high temperature services that contain process fluids which may contain hydrogen, acid gas, or other toxic gases. Common services in the petroleum and petrochemical industries that exhibit these characteristics are sulfur recovery unit reaction furnaces and gasification reactors.

The assemblies described herein are configured such that there is a gas impermeable barrier between the temperature sensor and the process fluid. This gas impermeable barrier element may contain gaseous compounds that would otherwise degrade the temperature sensor and prevent these compounds from coming into contact with the temperature sensor. Temperature sensors commonly used in industrial processes include platinum thermocouple pairs (type B, R, or S). In some instances, these thermocouples are sensitive to gaseous process fluids. Whereas porous ceramic protection tubes are commonly employed for high temperature service, the assemblies described herein include a protection tube that is constructed, at least partially, of a gas impermeable material, such as monocrystalline sapphire glass.

In one embodiment, as shown in FIGS. 1-7, a temperature sensing assembly 100 includes a thermowell 102, a temperature sensor 104, and at least one electrically conductive element 106. Temperature sensor 104 may be, for example, any appropriate type of thermocouple (e.g., type B, R or S). In one embodiment, temperature sensor 104 is a platinum type thermocouple wire pair in a single piece ceramic insulator. Electrically conductive elements 106 may be, for example, bare wires. In various embodiments, electrically conductive elements 106 are jacketed with PTFE tubing to prevent electrical signal shorting.

Figure 6:
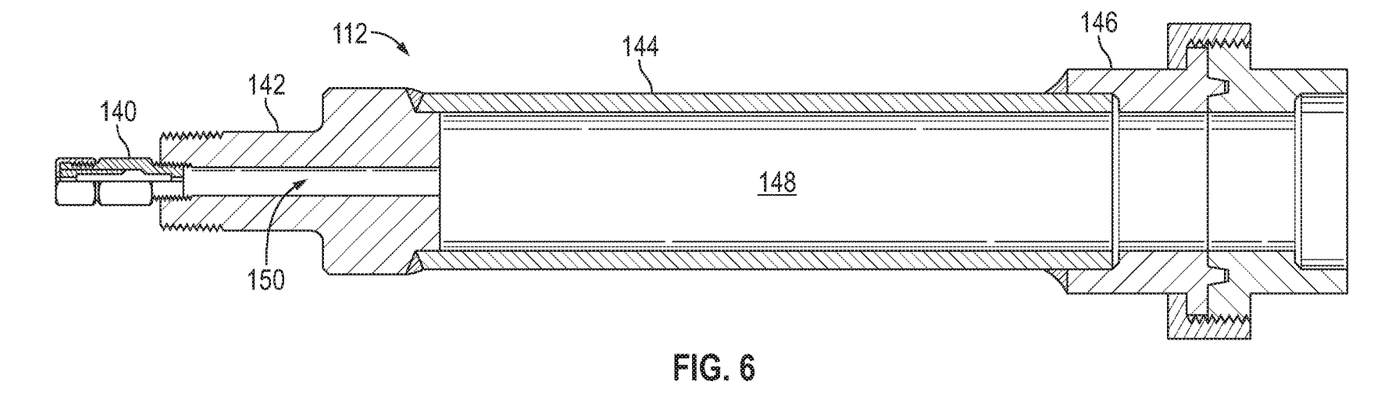
FIG. 6 shows a cross-section view of the third gas impermeable barrier element of the thermowell of the temperature sensing assembly of FIG. 1.

Thermowell 102 includes a first gas impermeable barrier element 108 (shown in detail in FIGS. 2 and 3), a second gas impermeable barrier element 110 (shown in detail in FIG. 4), and a third gas impermeable barrier element 112 (shown in detail in FIG. 6). First gas impermeable barrier element 108 includes a protection tube 114 and a first sealing element 116. Protection tube 114 is configured to be at least partially exposed to a process fluid, although it may be shielded from direct contact with the process fluid, as will be described herein. At least a portion of protection tube 114 is gas impermeable. For example, in one embodiment, protection tube 114 is constructed of monocrystalline sapphire glass. In other embodiments, protection tube 114 is constructed from polycrystalline sapphire glass. In various embodiments, protection tube 114 extends from a first end 118 to a second end 120 and defines a first chamber 122 therein.

Figure 3:
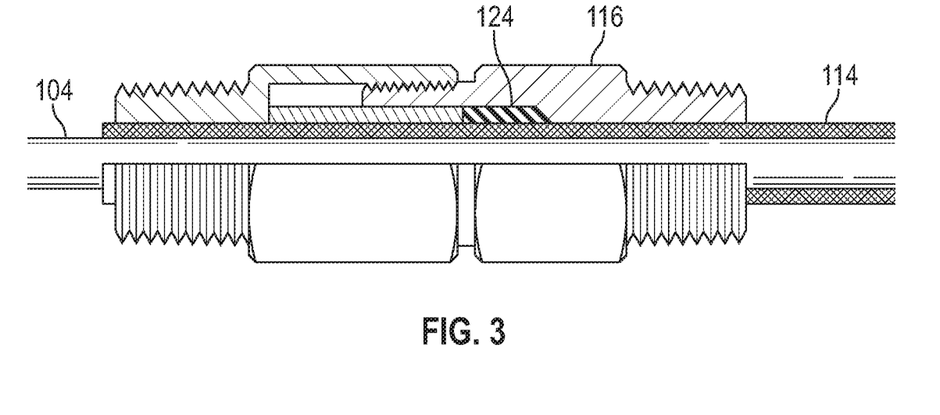
FIG. 3 shows a detail partial cross-section view of the first sealing element of the temperature sensing assembly of FIG. 1.

As shown best in FIG. 3, first sealing element 116 has a seal 124 that engages with the second end 120 of the protection tube 114. For example, seal 124 may engage the outer face of protection tube 114 near the second end 120 of protection tube 114. The engagement of seal 124 with protection tube 114 maintains first chamber 122 as gas impermeable to gasses within the process stream. First sealing element 116 may be, for example, a packing gland. In at least one embodiment, first sealing element 116 is a grafoil sealed packing gland, such as those sold by Conax Technologies of Buffalo, N.Y. In one embodiment, seal 124 is constructed of an elastomeric material.

Because gasses from the process stream are prevented from entering first chamber 122, temperature sensor 104, disposed therein, is protected from gasses within the process stream that may damage or degrade temperature sensor 104. This may allow the useful life of temperature sensor 104 to be extended. It may also increase the accuracy of the temperature measurements provided by temperature sensor 104. Temperature sensor 104 is further protected from exposure to process gasses by second gas impermeable barrier element 110 and third gas impermeable barrier element 112, as will be described herein.

Figure 1:
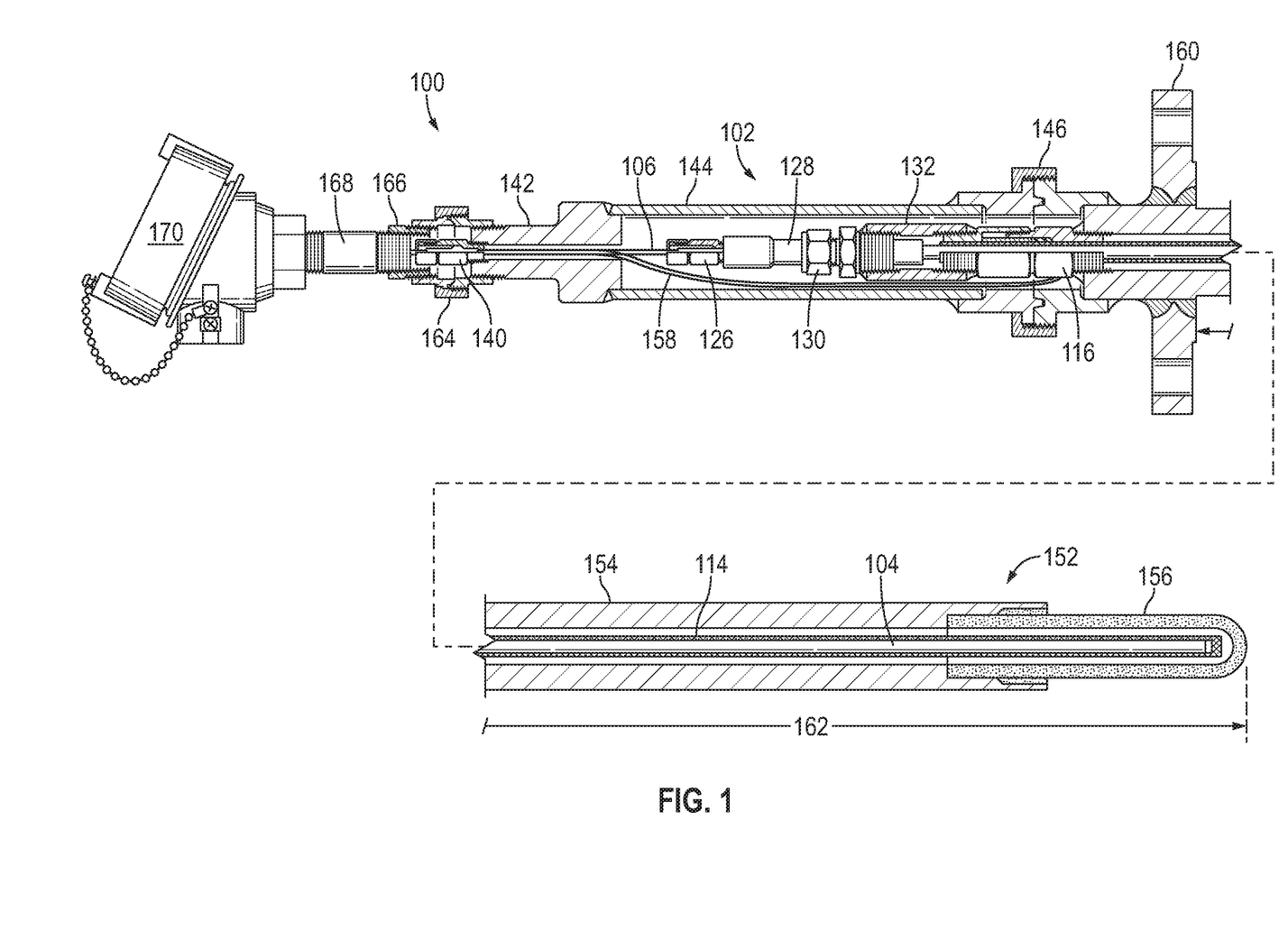
FIG. 1 shows a partial cross section of a temperature sensing assembly, according to one embodiment described herein.
Figure 2:
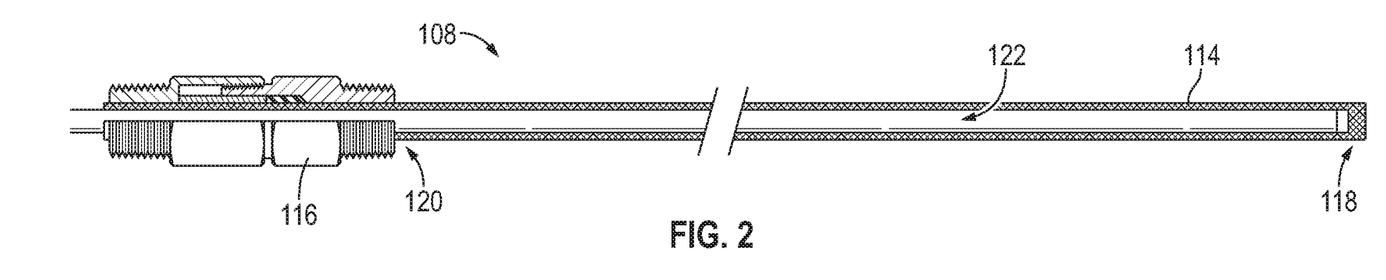
FIG. 2 shows a cross section of the first gas impermeable barrier element of the thermowell of the temperature sensing assembly of FIG. 1.
Figure 4:
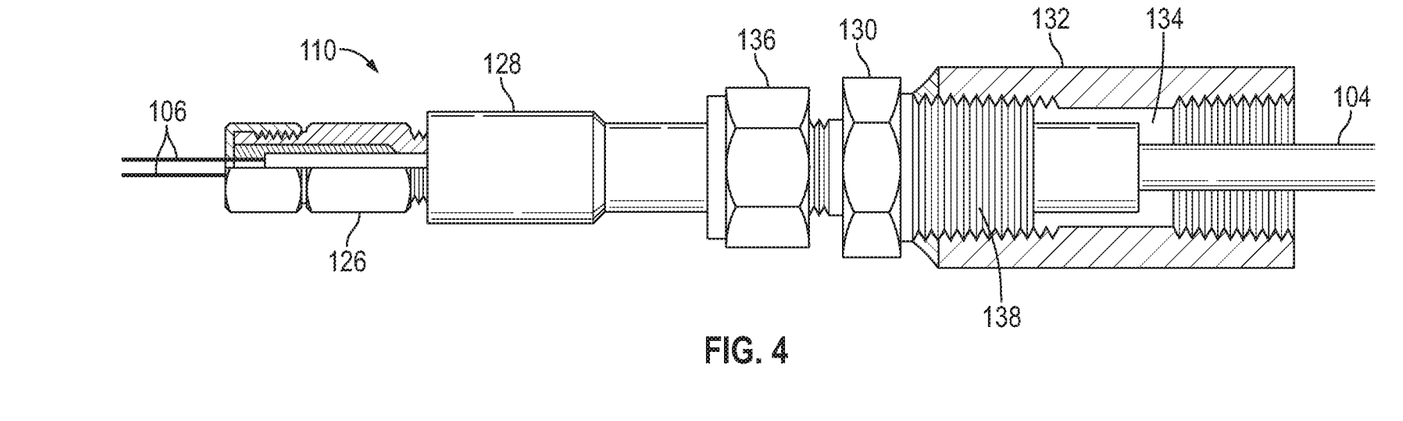
FIG. 4 shows a detail cross-section view of the second gas impermeable barrier element of the thermowell of the temperature sensing assembly of FIG. 1.

As shown in FIG. 4, in one embodiment, second gas impermeable barrier element 110 includes a second sealing element 126, a transition housing 128, a fitting 130, and a coupling 132. In various embodiments, second gas impermeable barrier element 110 is connected to first gas impermeable barrier element 108. For example, in one embodiment, as shown in FIG. 1, coupling 132 is welded to first sealing element 116. In such embodiments, the weld may be a seal weld. As a result, a gas impermeable chamber is constructed within second gas impermeable barrier element 110, as described in more detail below. Optionally, coupling 132 and first sealing element 116 may also be threadably engaged.

In various embodiments, a second chamber 134 is defined by the components of second gas impermeable barrier element 110. For example, transition housing 128 may define a portion of second chamber 134 within which temperature sensor 104 is coupled to electrically conductive elements 106, as shown best in FIG. 5. The internal passage of transition housing 128 may be sealed with epoxy or other material to retain temperature sensor 104 and/or electrically conductive elements 106 in place. Transition housing 128 may be constructed of any appropriate material. For example, in one embodiment, transition housing 128 is constructed from stainless steel.

Figure 5:
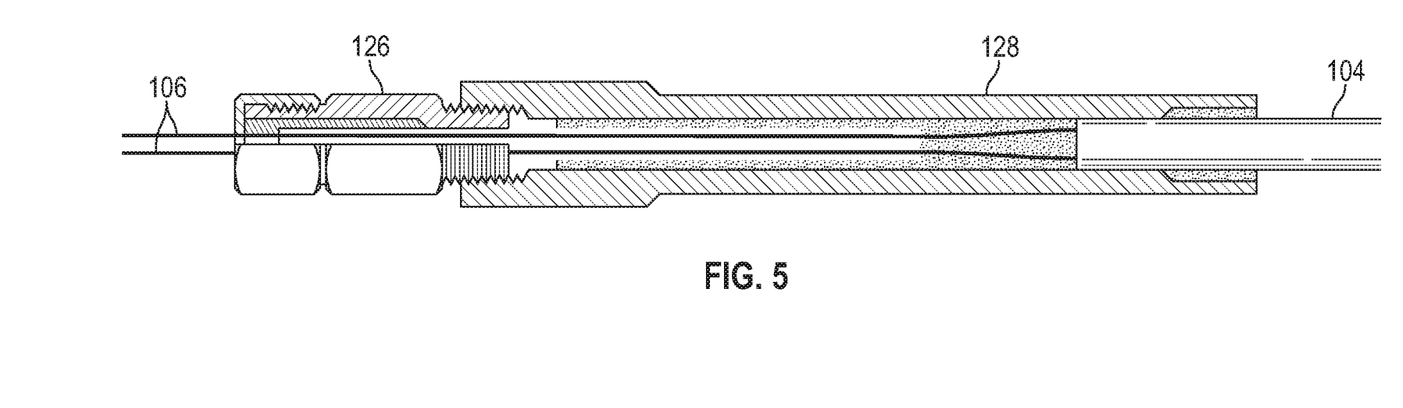
FIG. 5 shows a detail cross-sectional view of the transition housing and second sealing element of the temperature sensing assembly of FIG. 1.

Transition housing 128 is coupled to second sealing element 126. For example, as shown in FIG. 5, second sealing element 126 and transition housing 128 may be threadably engaged. Alternatively, or additionally, second sealing element 126 may be welded to transition housing 128. In various embodiments, second sealing element 126 is a multi-hole wire packing gland. For example, second sealing element 126 may be a lava sealed multi-wire gland. Second sealing element 126 allows passage of electrically conductive elements 106 through second sealing element 126 while preventing the passage of gasses into second chamber 134 defined by second gas impermeable barrier element 110.

The opposite end of transition housing 128 is connected to coupling 132 by fitting 130. Fitting 130 may be a compression fitting such as those sold by the Swagelok Company of Solon, Ohio. Fitting 130 may include a nut 136 used to tighten a ring onto the exterior of transition housing 128 to retain it in place. Fitting 130 may further include a threaded end 138 that engages internal threads in coupling 132.

Coupling 132 may be a generally cylindrical tube with internal threads at one end to engage fitting 130. Coupling 132 may further be threadably engaged with first sealing element 116 at an opposite end of coupling 132. In various embodiments, coupling 132 is further welded to both fitting 130 and first sealing element 116. In such embodiments, the welds may be seal welds to prevent the passage of air into second chamber 134. Coupling 132 may be constructed of any appropriate material. For example, in one embodiment, coupling 132 is constructed from stainless steel.

In one embodiment, as shown in FIG. 6, third gas impermeable barrier element 112 may include a third sealing element 140, a cap 142, a containment sleeve 144, and a pipe connector 146. Together, the components of third gas impermeable barrier element 112 form a third chamber 148.

In various embodiments, third sealing element 140 is a multi-hole wire sealing packing gland. Third sealing element 140 allows for passage of electrically conductive elements 106 such that temperature sensor 104 can be coupled to a control circuit, voltmeter, or other electronic component. Third sealing element 140 is coupled to cap 142. For example, third sealing element 140 may be threaded into and silver brazed to cap 142 to provide a gas impermeable seal. Cap 142 includes a passage 150 for passage of electrically conductive elements 106 to third sealing element 140. Cap 142 may be constructed from any appropriate material. For example, in one embodiment, cap 142 is constructed from stainless steel.

Cap 142 is coupled to containment sleeve 144 by any appropriate method. For example, in one embodiment, cap 142 is welded to containment sleeve 144. Such a weld may be a seal weld to prevent air from passing into third chamber 148. Containment sleeve 144 may be constructed of any appropriate material. For example, in one embodiment, containment sleeve 144 is constructed from stainless steel. Containment sleeve 144 is further coupled to pipe connector 146. Pipe connector 146 may be any type of pipe connection (e.g., a high pressure pipe union).

As shown in FIG. 1, in various embodiments, second gas impermeable barrier element 110 is disposed within third chamber 148. This provides multiple levels of protection to ensure that the process stream and ambient air are isolated from one another.

In various embodiments, temperature sensing assembly 100 further includes a mechanical protection element 152, as shown in FIG. 1 for providing mechanical protection for protection tube 114. Mechanical protection element 152 may include a sleeve 154 and a cover 156. Protection tube 114 is disposed, at least partially, within sleeve 154 and cover 156.

Sleeve 154 may be constructed of, for example, a metallic material, such as stainless steel, steel, or aluminum. Cover 156 may be constructed of, for example, ceramic materials. Cover 156 may be connected to sleeve 154 in any appropriate manner. For example, in one embodiment, cover 156 is connected to sleeve 154 using high-temperature cement. In other embodiments, cover 156 is bonded to sleeve 154 using any other appropriate material. In various embodiments, sleeve 154 is bored to match the inside diameter of cover 156. In other embodiments, sleeve 154 and cover 156 are a single monolithic body. In at least one embodiment, cover 156 is closed at one end to fully shield protection tube 114 from the process stream.

As shown in FIG. 1, first gas impermeable barrier element 108 may be connected to mechanical protection element 152. For example, first sealing element 116 may be threaded into sleeve 154 and seal welded. When assembled, protection tube 114 is positioned such that there is a small gap between the first end 118 of protection tube 114 and the inside of cover 156 to allow for thermal expansion tolerance between the different materials.

As shown in FIG. 1, third gas impermeable barrier element 112 may also be connected to mechanical protection element 152, for example by welding pipe connector 146 to sleeve 154. Pipe connector 146 may also be tack welded in the assembled position to prevent field modification of second 110 or third 112 gas impermeable barrier element. The connection of third gas impermeable barrier element 112 to mechanical protection element 152 closes third chamber 148.

Figure 7:
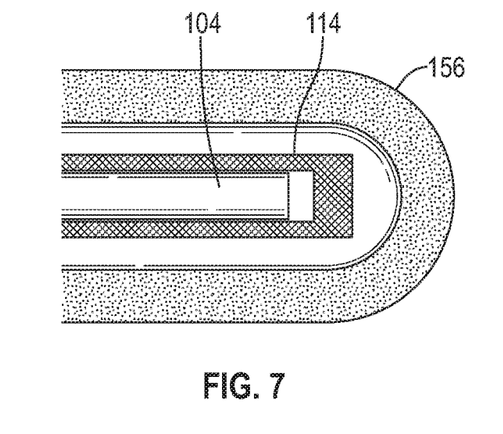
FIG. 7 shows a detail view of the end of the protection tube and cover of the temperature sensing assembly of FIG. 1.
Figure 8:
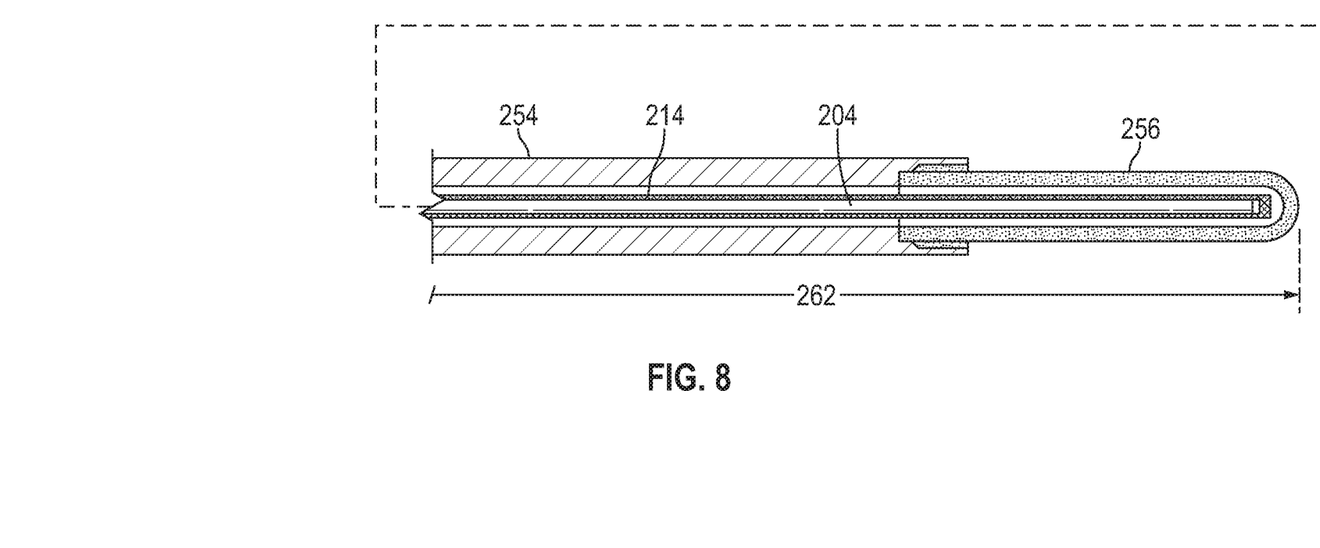
FIG. 8 shows a cross-section of a temperature sensing assembly, according to another embodiment described herein.

Temperature sensor 104 is disposed within first chamber 122 defined by protection tube 114. Temperature sensor 104 extends toward first end 118 of protection tube 114. In various embodiments, as shown in FIG. 7, a gap exists between the end of temperature sensor 104 and first end 118 of protection tube 114 to allow for differences in thermal expansion rates of the different materials. Temperature sensor 104 extends out of protection tube 114 at second end 120 of protection tube 114 and passes through coupling 132. As shown in FIG. 5, temperature sensor 104 then transitions to electrically conductive elements 106 within second chamber 134 (e.g., within transition housing 128). As described above, a portion of transition housing 128 may be sealed with epoxy. Electrically conductive elements 106 extend through second sealing element 126 and into third chamber 148.

Returning to FIG. 1, temperature sensing assembly 100 can also include a leak detection temperature sensor 158. In various embodiments, leak detection temperature sensor 158 is disposed in third chamber 148. In some embodiments, leak detection temperature sensor 158 may be a thermocouple. In such embodiments, the thermocouple junction of leak detection temperature sensor 158 may be welded to first sealing element 116. In the event of a breach of thermowell 102 (e.g., intrusion of gas into first chamber 122), the temperature of first sealing element 116 would exhibit a detectable rise in temperature. Leak detection temperature sensor 158 may be used in lieu of, or in addition to, traditional pressure gauges for breach detection. The use of leak detection temperature sensor 158 may be particularly well-suited for low pressure processes.

Thermowell 102 is configured to be connected to a process vessel or pipe. Thermowell 102 may be connected to the process vessel or pipe using any appropriate method. For example, as shown in FIG. 1, thermowell 102 may include a flange 160 for mounting to the process vessel or pipe using bolts or other fasteners. In at least one embodiment, sleeve 154 is attached to flange 160 via a full penetration weld on the process side of flange 160. In other embodiments, thermowell 102 is connected to the process vessel or pipe via a threaded connection or a socket weld or is welded to the process vessel or pipe.

In various embodiments, sleeve 154 is configured to be partially recessed in the refractory lining of the vessel with cover 156 directly exposed to the interior space of the process vessel. Sleeve 154 may offer protection from shifting refractory in the lining of the vessel that may otherwise damage the protection tube 114. When the thermowell 102 is installed in the process vessel or pipe, the unsupported length 162 of thermowell 102 is exposed to the process media.

In various embodiments, thermowell 102 may further include a union 164, a hex reducer 166, a nipple 168, and an explosion proof head 170. These components may provide protection from pressure and materials within the process stream and also allow servicing and replacement of temperature sensing assembly 100. When installed in a process vessel, electrically conductive elements 106 may pass through one or more of these components to be connected to wiring that relays the signal from temperature sensor 104 to a control circuit, voltmeter, or other electrical components configured to monitor or display the temperature in the process stream. Further, electrically conductive elements may extend from leak detection temperature sensor 158 and connect to such a control circuit or voltmeter to allow an operator to monitor the temperature within thermowell 102 to identify leaks within the thermowell.

Another embodiment of a temperature sensing assembly is shown in FIGS. 8-11. Temperature sensing assembly 200, shown in FIGS. 8-11, may be similar in many aspects to temperature sensing assembly 100, shown in FIGS. 1-7. The first digit of the reference numbers used in FIGS. 8-11 are incremented by one numeral with reference to those used in FIGS. 1-7 (e.g., 104, 204) for similar components or features. Unless expressly described herein, components and features of temperature sensing assembly 100 may be substantially similar to those of temperature sensing assembly 100. Further, aspects of one embodiment may be combined with those of other embodiments.

Figure 9:
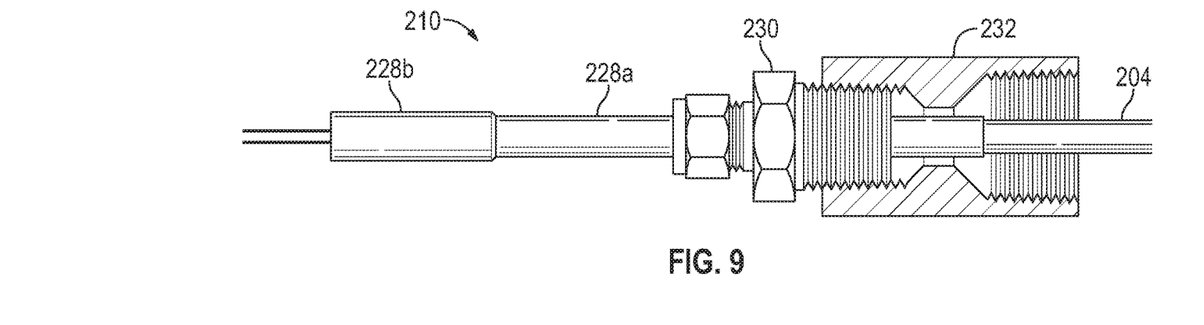
FIG. 9 shows a detail cross-section view of the second gas impermeable barrier element of the thermowell of the temperature sensing assembly of FIG. 8.
Figures 10, 11:
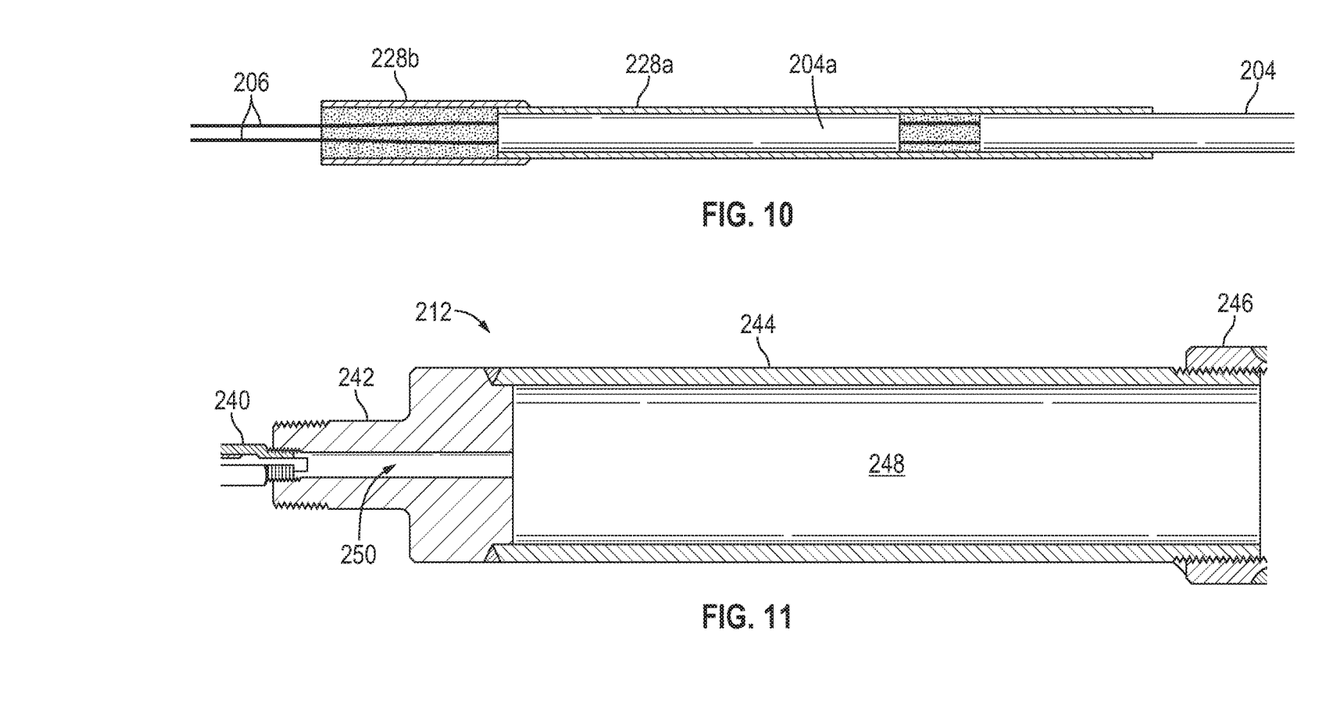
FIG. 10 shows the transition housing and transition tube of the temperature sensing assembly of FIG. 8.
FIG. 11 shows a cross-section view of the third gas impermeable barrier element of the thermowell of the temperature sensing assembly of FIG. 8.

As shown best in FIGS. 9 and 10, second gas impermeable barrier element 210 may include a transition tube 228a and a transition housing 228b. In this embodiment, temperature sensor 204 transitions to a temperature sensor cable 204a. This transition is disposed within transition tube 228a and is sealed with epoxy. Temperature sensor cable 204a may be, for example, a mineral insulated metal sheath thermocouple cable.

The opposite end of temperature sensor cable 204a is also sealed with epoxy within transition housing 228b. The wires contained in temperature sensor cable 204a are connected to electrically conductive elements 206 (e.g., lead wires). Electrically conductive elements 206 may be jacketed with PTFE tubing to prevent electrical signal shorting.

As shown in FIG. 11, third gas impermeable barrier element 212 may include a ring 246. Ring 246 may be threadably engaged with containment sleeve 244 and welded to flange 260. Ring 246 may further be tack welded to containment sleeve 244. Additionally, or alternatively, ring 246 may be cemented to containment sleeve 244 and/or flange 260. Similar to pipe connector 146, described above, ring 246 joins third gas impermeable barrier element 112 to mechanical protection element 152.

The temperature sensing assemblies described herein may be designed such that some or all of the assembly components may be changed or repaired during future maintenance to minimize the cost of refurbishing.

In other embodiments, a method of monitoring temperature in a process fluid includes exposing a temperature sensing assembly according to any of the embodiments described herein to the process fluid. The method further includes connecting an electrically conductive element from a thermocouple disposed in the thermowell to a control circuit. The method may further include monitoring the temperature of the process fluid over time to identify changes in temperature of the process fluid.

Figure 12:
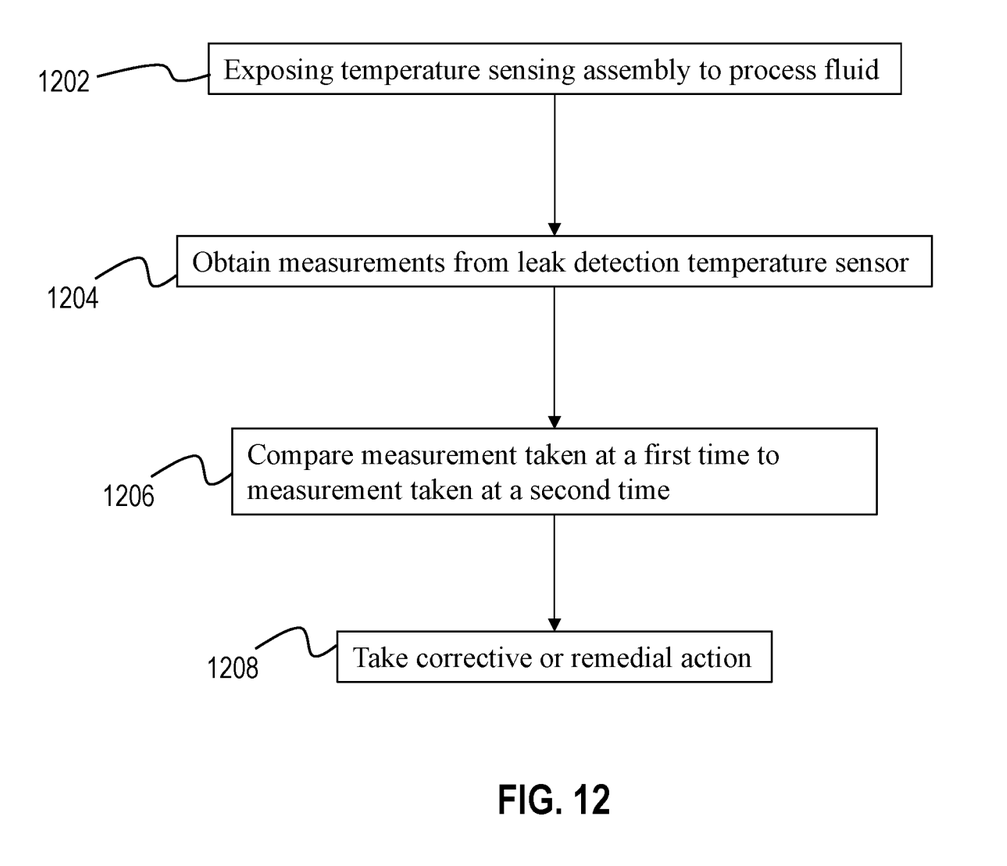
FIG. 12 shows a flowchart illustrating a method of detecting a leak in a thermowell.

FIG. 12 is an exemplary flow diagram showing techniques for detecting a leak in a thermowell using leak detection temperature sensor 158, 258. At block 1202, the temperature sensing assembly 100, 200 is exposed to a process fluid. At block 1204, measurements are obtained from leak detection temperature sensor 158, 258. At block 1206, the measurements taken at a first time are compared to measurements taken at a second time. At block 1208, corrective or remedial action is taken based on the comparison, if needed. For example, if the temperature measurement taken at the second time is significantly greater than the measurement taken at the first time, this may inform an operator that a leak has occurred in thermowell 102, 202. As described above, an increase in the temperature measurement taken by leak detection temperature sensor 158, 258 may indicate that a leak has developed in first gas impermeable barrier element 108. Thus, the temperature sensing assembly may need to be replaced or repaired.

While the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention. All patents and published patent applications identified herein are incorporated herein by reference in their entireties.

What is claimed is:

1. A temperature sensing assembly, comprising:
    a thermowell comprising:
        a first gas impermeable barrier element defining a first chamber, wherein the first gas impermeable barrier element is constructed at least partially from monocrystalline sapphire glass; and
        a second gas impermeable barrier element defining a second chamber;
    a temperature sensor at least partially disposed within the first chamber; and
    at least one electrically conductive element connected to the temperature sensor;
    wherein the at least one electrically conductive element is connected to the temperature sensor in the second chamber.

2. The temperature sensing assembly of claim 1, wherein the thermowell further comprises a third gas impermeable barrier element defining a third chamber, and wherein the second gas impermeable barrier element is disposed within the third chamber.

3. The temperature sensing assembly of claim 1, wherein the first gas impermeable barrier element includes a tube extending from a first end to a second end, and wherein the first end is closed and the exterior of the second end is sealed by a sealing element.

4. The temperature sensing assembly of claim 1, wherein the second gas impermeable barrier element includes a packing gland.

5. A temperature sensing assembly, comprising:
    a thermowell comprising:
        a protection tube extending from a first end to a second end and configured to be at least partially disposed within a process stream or vessel, wherein the first end of the protection tube is closed; and
        a sealing element having a seal engaged with the second end of the protection tube such that a chamber is defined within the protection tube and gas within the process stream or vessel is prevented from entering the chamber;
    a first temperature sensor disposed at least partially within the chamber; and
    a second temperature sensor configured to monitor the temperature of a portion of the sealing element to detect a leak in the thermowell.

6. The temperature sensing assembly of claim 5, wherein the first temperature sensor is a thermocouple.

7. The temperature sensing assembly of claim 5, wherein the protection tube is constructed from monocrystalline sapphire glass.

8. The temperature sensing assembly of claim 5, wherein the thermowell further comprises a sleeve having a first end and a second end and a bore extending therethrough, and wherein the protection tube is disposed at least partially within the bore and the second end of the sleeve is coupled to the sealing element.

9. The temperature sensing assembly of claim 8, wherein the thermowell further comprises a cover coupled to the first end of the sleeve and at least partially encompassing the protection tube.

10. The temperature sensing assembly of claim 5, wherein the thermowell further comprises a transition housing and at least one electrically conductive element connected to the first temperature sensor, and wherein the transition housing is coupled to the sealing element and the connection between the first temperature sensor and the at least one electrically conductive element is disposed within the transition housing.

11. The temperature sensing assembly of claim 10, wherein the transition housing is coupled to a second sealing element, and wherein a second chamber is defined by the transition housing, the sealing element, and the second sealing element.

12. The temperature sensing assembly of claim 11, wherein the thermowell further comprises a coupling coupled to the sealing element and a fitting coupled to the coupling and to the transition housing, and wherein the coupling and the fitting further define the second chamber.

13. The temperature sensing assembly of claim 11, wherein the thermowell further comprises:
    a sleeve having a first end and a second end and a bore extending therethrough, and wherein the protection tube is disposed at least partially within the bore and the second end of the sleeve is coupled to the sealing element; and
    a third sealing element, wherein a third chamber is formed between the third sealing element and the sleeve and the transition housing is disposed within the third chamber.

14. The temperature sensing assembly of claim 13, wherein the thermowell further comprises a containment sleeve extending between the third sealing element and the sleeve, and wherein the containment sleeve further defines the third chamber.

15. The temperature sensing assembly of claim 14, wherein the sleeve is connected to the containment sleeve by a pipe connector and the pipe connector further defines the third chamber.

16. The temperature sensing assembly of claim 15, wherein the thermowell further comprises a cap coupled to the containment sleeve and to the third sealing element, and wherein the cap further defines the third chamber.

17. A method of detecting a leak in a thermowell, comprising:
    exposing a temperature sensing assembly to process fluids, wherein the temperature sensing assembly, comprises:
        a thermowell comprising:
            a protection tube extending from a first end to a second end and configured to be at least partially disposed within the process fluids, wherein the first end of the protection tube is closed; and
            a sealing element having a seal engaged with the second end of the protection tube such that a chamber is defined within the protection tube and gas within the process fluids is prevented from entering the chamber;
        a first temperature sensor disposed at least partially within the chamber; and a second temperature sensor configured to monitor the temperature of a portion of the sealing element to detect a leak in the thermowell;

obtaining measurements from the second temperature sensor; and comparing a first measurement from the second temperature sensor taken at a first time to a second measurement from the second temperature sensor taken at a second time.

18. The method of claim 17, further comprising, if the difference between the first measurement and the second measurement is above a threshold, taking corrective action.

19. A temperature sensing assembly, comprising:
a thermowell comprising:
   a protection tube extending from a first end to a second end and configured to be at least partially disposed within a process stream or vessel, wherein the first end of the protection tube is closed, and wherein the protection tube is constructed from monocrystalline sapphire glass; and
   a sealing element having a seal engaged with the second end of the protection tube such that a chamber is defined within the protection tube and gas within the process stream or vessel is prevented from entering the chamber; and
a temperature sensor disposed at least partially within the chamber.

20. A temperature sensing assembly, comprising:
a thermowell comprising:
   a first gas impermeable barrier element defining a first chamber;
   a second gas impermeable barrier element defining a second chamber; and
   a third gas impermeable barrier element defining a third chamber, wherein the second gas impermeable barrier element is disposed within the third chamber;
a temperature sensor at least partially disposed within the first chamber; and
at least one electrically conductive element connected to the temperature sensor;
wherein the at least one electrically conductive element is connected to the temperature sensor in the second chamber.

21. A temperature sensing assembly, comprising:
a thermowell comprising:
   a protection tube extending from a first end to a second end and configured to be at least partially disposed within a process stream or vessel, wherein the first end of the protection tube is closed;
   a first sealing element having a seal engaged with the second end of the protection tube such that a first chamber is defined within the protection tube and gas within the process stream or vessel is prevented from entering the chamber;
   a transition housing coupled to the first sealing element;
   a second sealing element coupled to the transition housing;
   a coupling coupled to the first sealing element; and
   a fitting coupled to the coupling and to the transition housing, wherein a second chamber is defined by the transition housing, the first sealing element, the second sealing element, the coupling, and the fitting;
a temperature sensor disposed at least partially within the first chamber; and
at least one electrically conductive element connected to the temperature sensor;
wherein the connection between the temperature sensor and the at least one electrically conductive element is disposed within the transition housing.

22. A temperature sensing assembly, comprising:
a thermowell comprising:
   a protection tube extending from a first end to a second end and configured to be at least partially disposed within a process stream or vessel, wherein the first end of the protection tube is closed;
   a first sealing element having a seal engaged with the second end of the protection tube such that a first chamber is defined within the protection tube and gas within the process stream or vessel is prevented from entering the chamber;
   a transition housing coupled to the first sealing element;
   a second sealing element coupled to the transition housing wherein a second chamber is defined by the transition housing, the first sealing element, and the second sealing element;
   a sleeve having a first end and a second end and a bore extending therethrough, and wherein the protection tube is disposed at least partially within the bore and the second end of the sleeve is coupled to the first sealing element; and
   a third sealing element, wherein a third chamber is formed between the third sealing element and the sleeve and the transition housing is disposed within the third chamber;
a temperature sensor disposed at least partially within the first chamber; and
at least one electrically conductive element connected to the temperature sensor;
wherein the connection between the temperature sensor and the at least one electrically conductive element is disposed within the transition housing.

* * * * *